(12) United States Patent
Chen

(10) Patent No.: US 7,182,310 B2
(45) Date of Patent: Feb. 27, 2007

(54) POSITION RETURN DEVICE FOR AN OPEN AND CLOSE APPARATUS

(76) Inventor: Shui-Ching Chen, No. 81, Lane 355, San Kang Road, Lung Ching Tsun, Lung Ching Hsiang, Taichung Hsien (TW) 434

( * ) Notice: Subject to any disclaimer, the term of this patent is extended or adjusted under 35 U.S.C. 154(b) by 0 days.

(21) Appl. No.: 11/159,685

(22) Filed: Jun. 24, 2005

(65) Prior Publication Data

US 2006/0289820 A1 Dec. 28, 2006

(51) Int. Cl.
*F16K 31/44* (2006.01)
*F16K 31/02* (2006.01)

(52) U.S. Cl. .............. 251/69; 251/250; 251/129.11

(58) Field of Classification Search ........... 251/129.11, 251/69, 129.12, 31, 74, 71, 68, 250, 77
See application file for complete search history.

(56) References Cited

U.S. PATENT DOCUMENTS 5,325,888 A * 7/1994 Stary .................... 251/250
5,950,427 A * 9/1999 Demerjian et al. ........... 60/404
6,173,740 B1 * 1/2001 Marinoni et al. ........... 251/250
6,488,260 B1 * 12/2002 Dietz ..................... 251/129.13

* cited by examiner

*Primary Examiner*—Eric Keasel
*Assistant Examiner*—Andrew J. Rost

(57) ABSTRACT

A position return device for an open and close apparatus includes a casing base, a first actuating member, a second actuating member, a first end cover, a second end cover, an output shaft and a motor. The casing base has a main member with a hollow seat at the top thereof. The first actuating member has a first disk part with a first block member extending from a lateral side thereof to form a first rack. The second actuating member has a second disk part with a second block extending from the right end thereof to form a second rack. The first end cover provides a plurality of first elastic members at the left end thereof. The second end cover provides a plurality of second elastic members at the right end thereof. The output shaft has a pinion joining part to mesh with the first and second racks. The motor shaft of the motor extends upward a rod part and the rod part is attached to an electric magnet, a stationary disk member and a movable disk member.

5 Claims, 9 Drawing Sheets

US 7,182,310 B2

POSITION RETURN DEVICE FOR AN OPEN AND CLOSE APPARATUS

BACKGROUND OF THE INVENTION

1. Field of the Invention

The present invention is related to a valve or any other open and close apparatus and particularly to a position return device for an open and close apparatus.

2. Brief Description of the Related Art

In order to pursue fast speed and convenience, an open and close function of electrical actuation has been developed by the manufacturers for controlling ball valve, butterfly valve or other types of valves.

However, in case of the valves being required to shut urgently under a condition of emergency happening to power failure or power off accidentally, how to close the valves immediately is a problem bothering the manufacturers and the users. Besides, sometimes, the users desire to operate the valves manually but it is not possible for them to enter the shop to open or close the valves.

SUMMARY OF THE INVENTION

A primary object of the present invention is to provide a position return device for an open and close apparatus which is capable of returning the open and close apparatus to the original position thereof rapidly in case of power failure or power off accidentally.

BRIEF DESCRIPTION OF THE RAWINGS

The detail structure, the applied principle, the function and the effectiveness of the present invention can be more fully understood with reference to the following description and accompanying drawings, in which.

Figure 4:
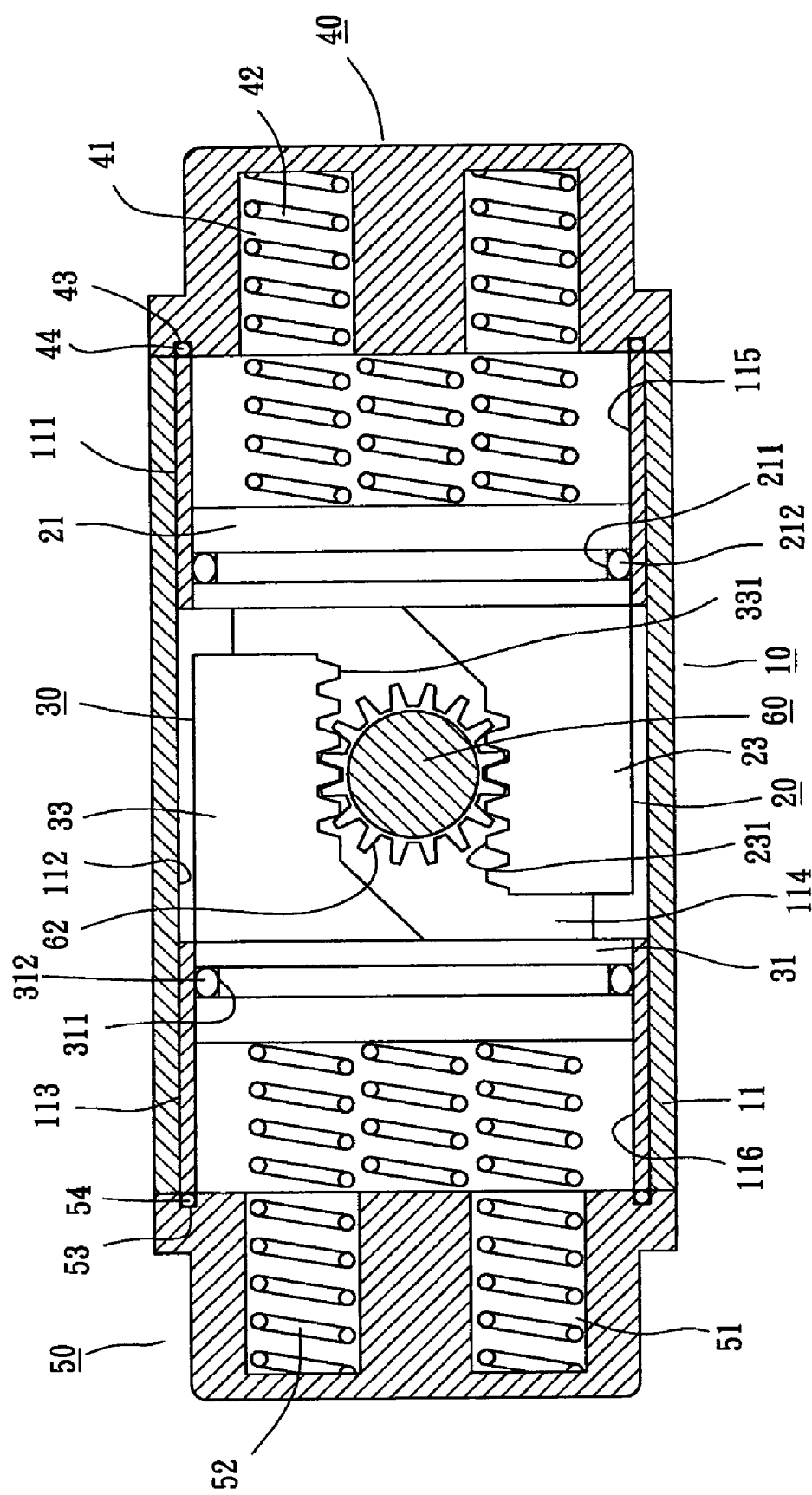
FIG. 4 is a sectional view along line 4—4 shown in FIG. 3.
Figure 5:
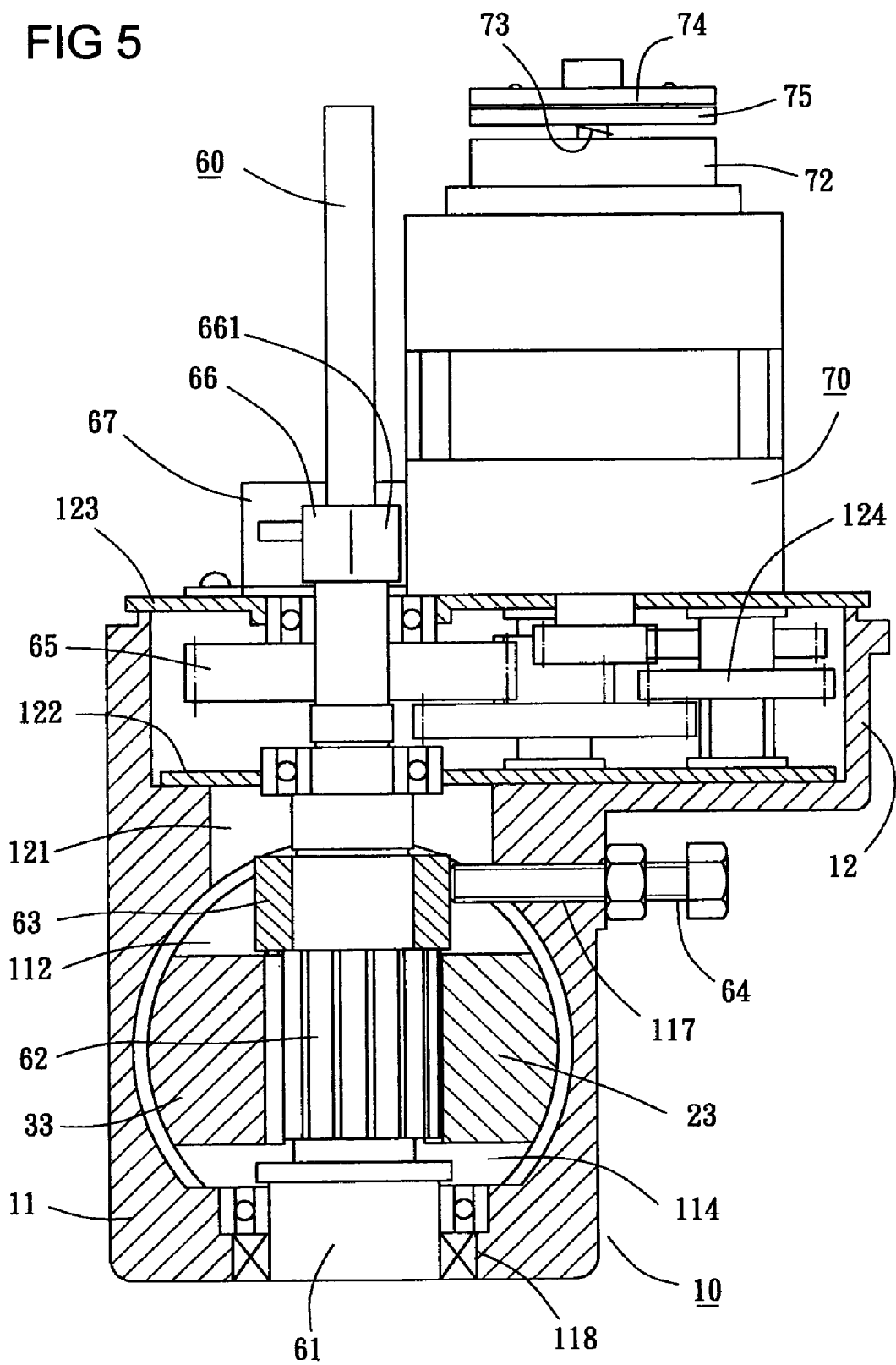
FIG. 5 is a sectional view along line 5—5 shown in FIG. 3.
Figure 6:
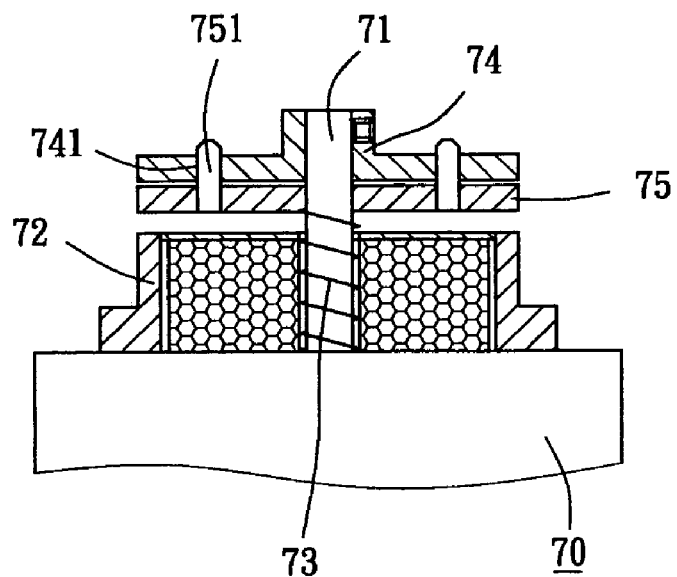
Figure 7:
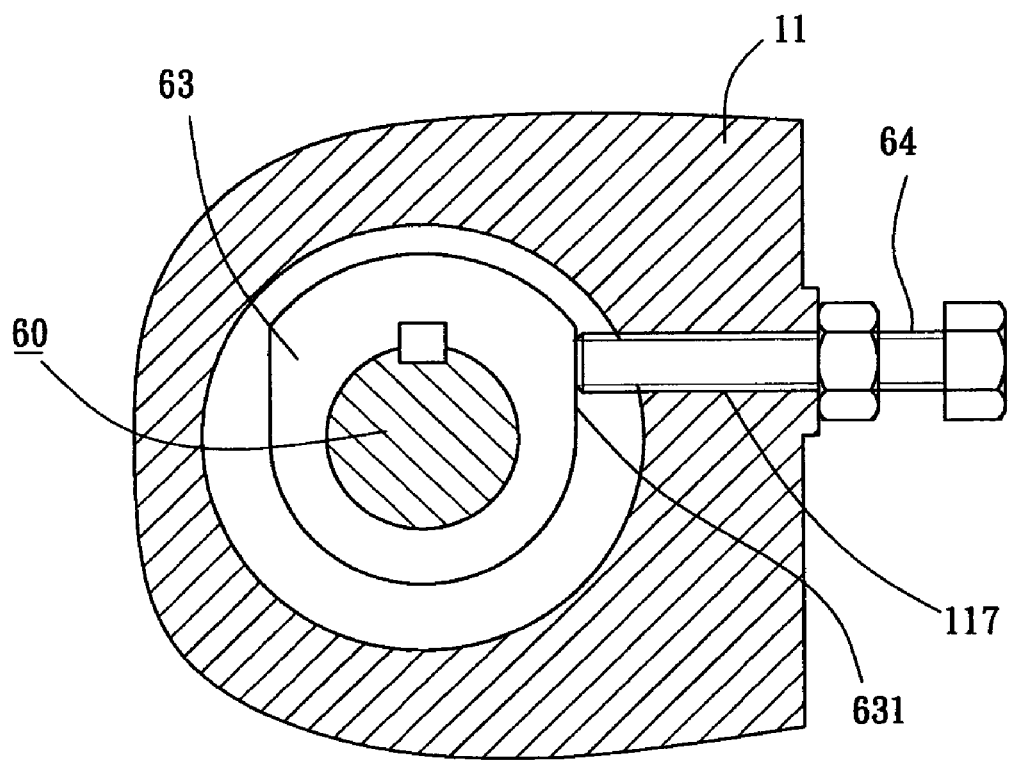
Figure 8:
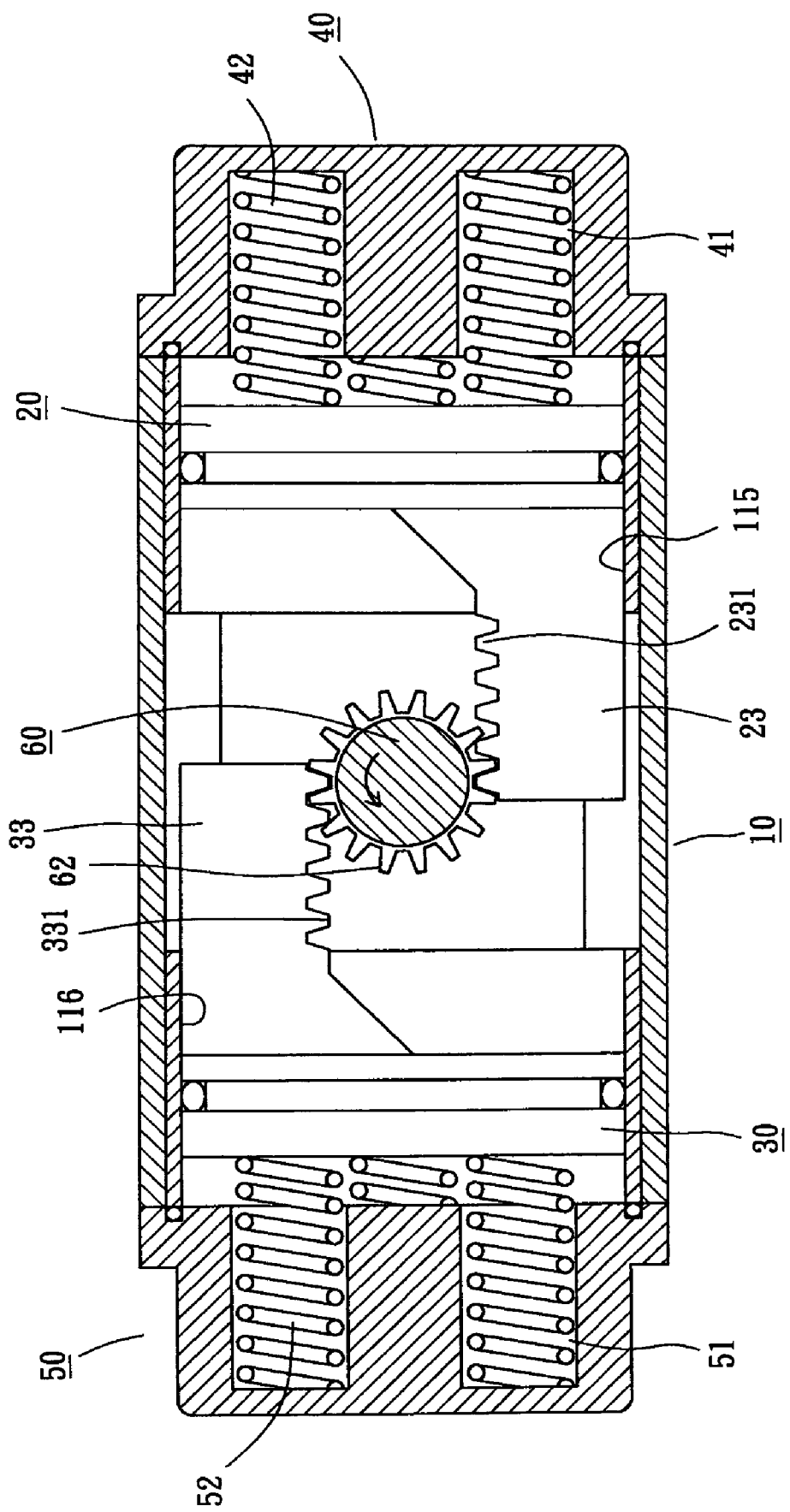
Figure 9:
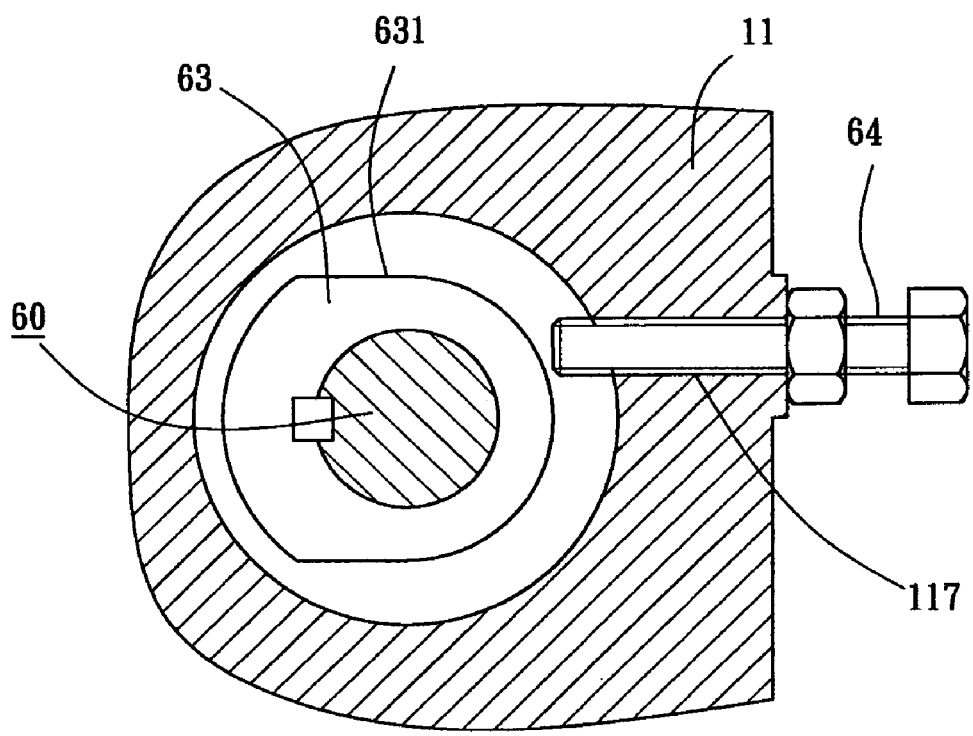
Figure 11:
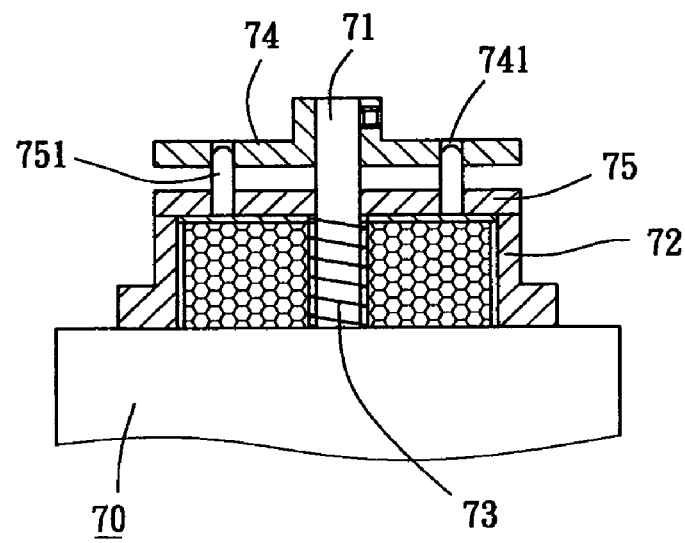
Figure 10:
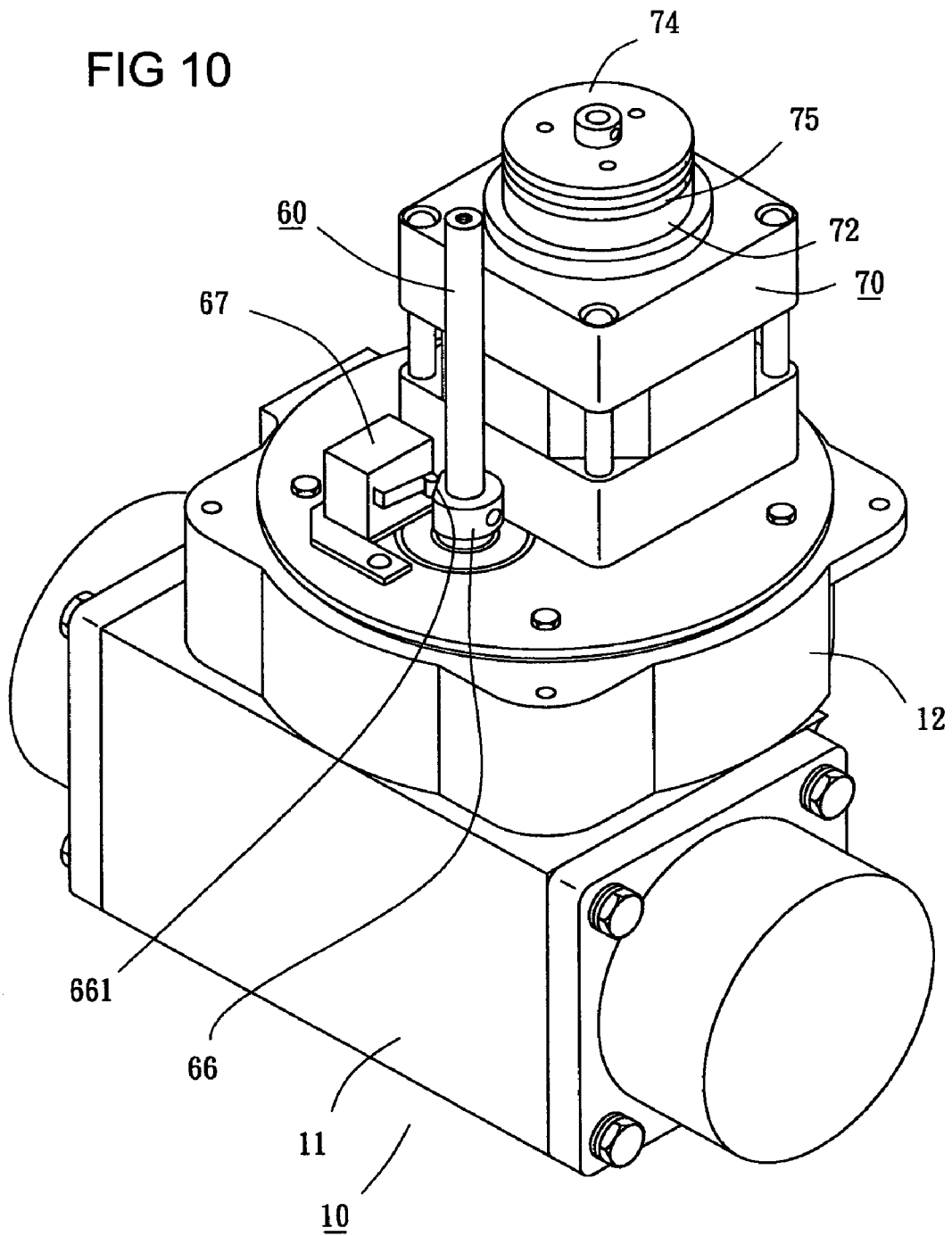

FIG. 6 is a fragmentary sectional view illustrating a structural relationship between the electric magnet 72, the movable disk 75 and stationary disk 74 shown in FIG. 5;

FIG. 7 is a sectional view illustrating structural relationship between the screw member 64 and the first cam 63 shown in FIG. 5;

FIG. 8 is sectional view similar to FIG. 4 illustrating movements of the first actuating member 20 and the second actuating member 30;

FIG. 9 is a sectional view similar to FIG. 7 illustrating the screw member 64 detaching the first cam 63;

FIG. 10 is another perspective view of the position return device according to the present invention illustrating the flat surface 661 of the second cam 66 contacting the micro switch 67; and FIG. 11 is a sectional view similar to FIG. 6 illustrating the electric magnet 72 attracting the movable disk 75.

DETAILED DESCRIPTION OF THE INVENTION

A position return device for an open and close apparatus according to the present invention is described hereinafter.

Figure 1:
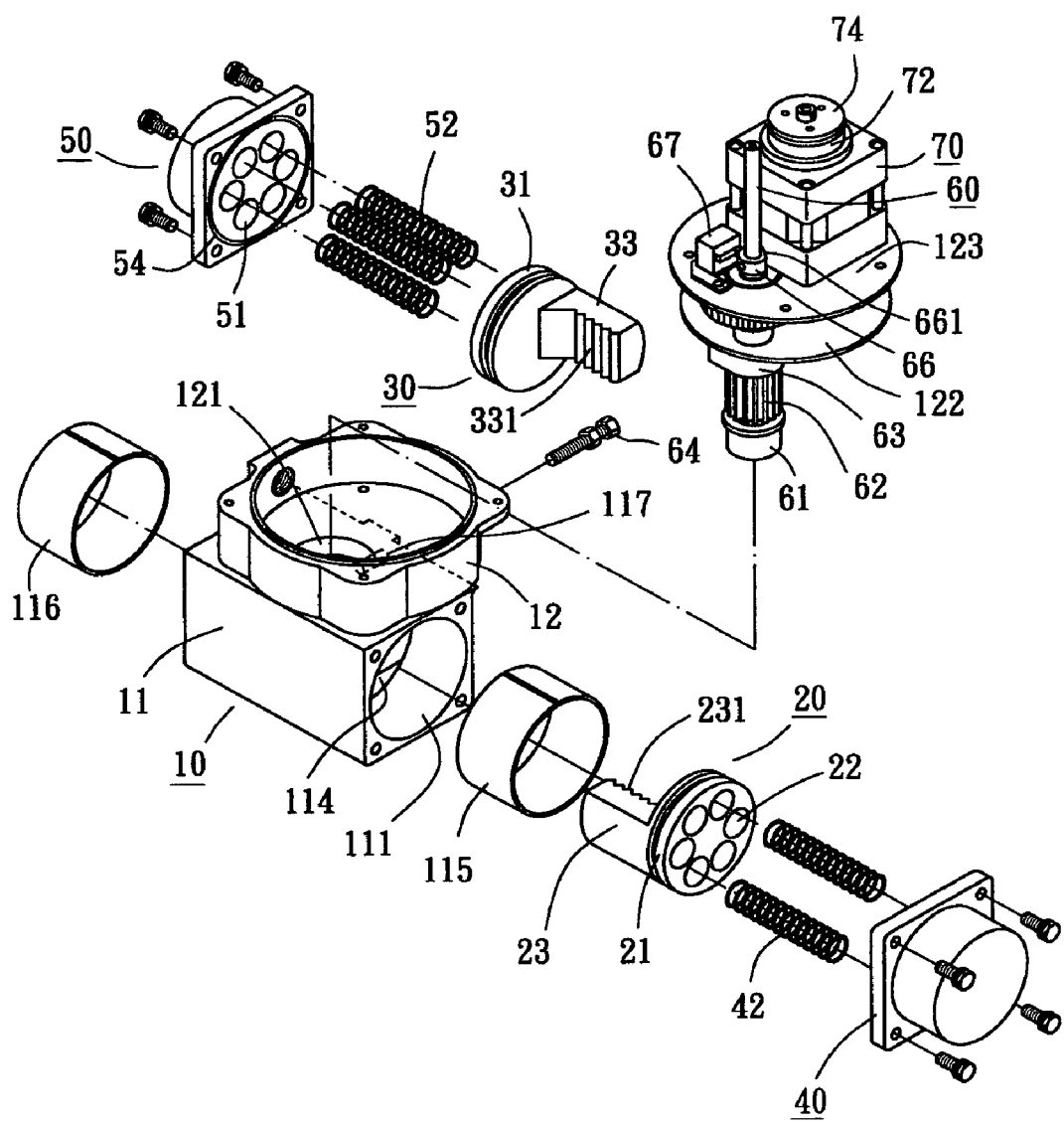
FIG. 1 is an exploded perspective view of a position return device for an open and close apparatus according to the present invention.

Referring to FIGS. 1, 4 and 5, a casing base 10 provides a rectangular main member 11 with a hollow seat 12 on top thereof. The main member 11 has an axial through hole, which is divided into a right hole section 111, a middle hole section 112 and a left hole section 113 respectively. The middle hole section 112 has a lower support plate 114. The right hole section 111 and left hole section 113 fit with a first bearing 115 and a second bearing 116 respectively. A through threaded hole 117 as shown in FIG. 5 is provided at the upper section of the rear end face of the main member 11 to communicate with the middle hole section 112. A through hole 121 is disposed at the bottom wall of the hollow seat 12. A fitting hole 118 is disposed at the bottom of the support plate 114 corresponding to the through hole 121. A first circular plate member 122 is fixedly attached to the bottom wall of the hollow seat 12 and a second circular plate member 123 is fixedly attached to the top side of the hollow seat 12. A speed reduction gear set 124 is disposed in side the hollow seat 12.

Referring to FIGS. 1 and 4 again, a first actuating member 20 has a first disk part 21 with a plurality of first blind holes 22 at the right side thereof and a first block member 23 extending leftward from the left side thereof. The first block member 23 has a first rack 231 at the rear side thereof. The first disk part 21 has a first annular recess 211 at the circumferential side thereof with a first O-ring 212 being received in the first annular recess 211. The first disk part 21 of the first actuating member 20 is inserted into and fits with the left end section of the first bearing 115.

Figure 2:
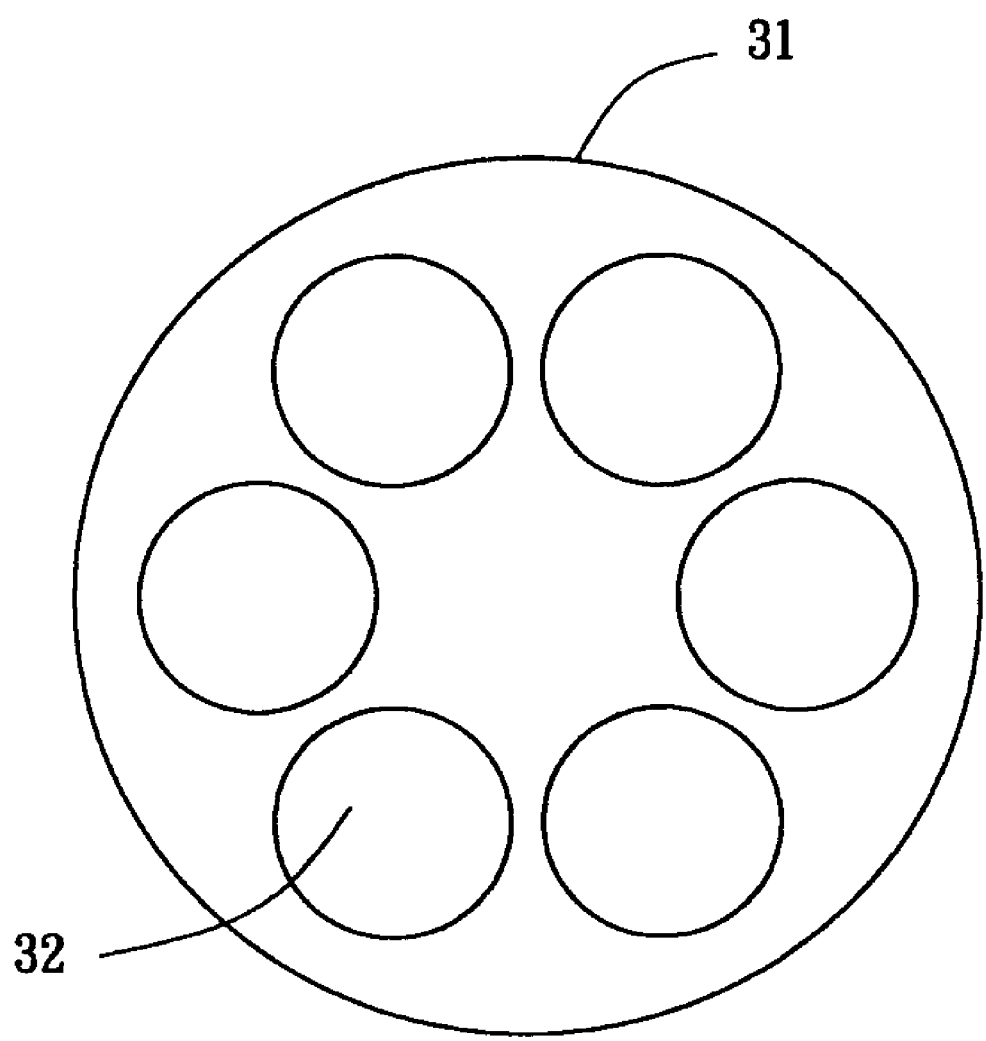
FIG. 2 is a left side view of a second actuating member 30 shown in FIG. 1.
Figure 3:
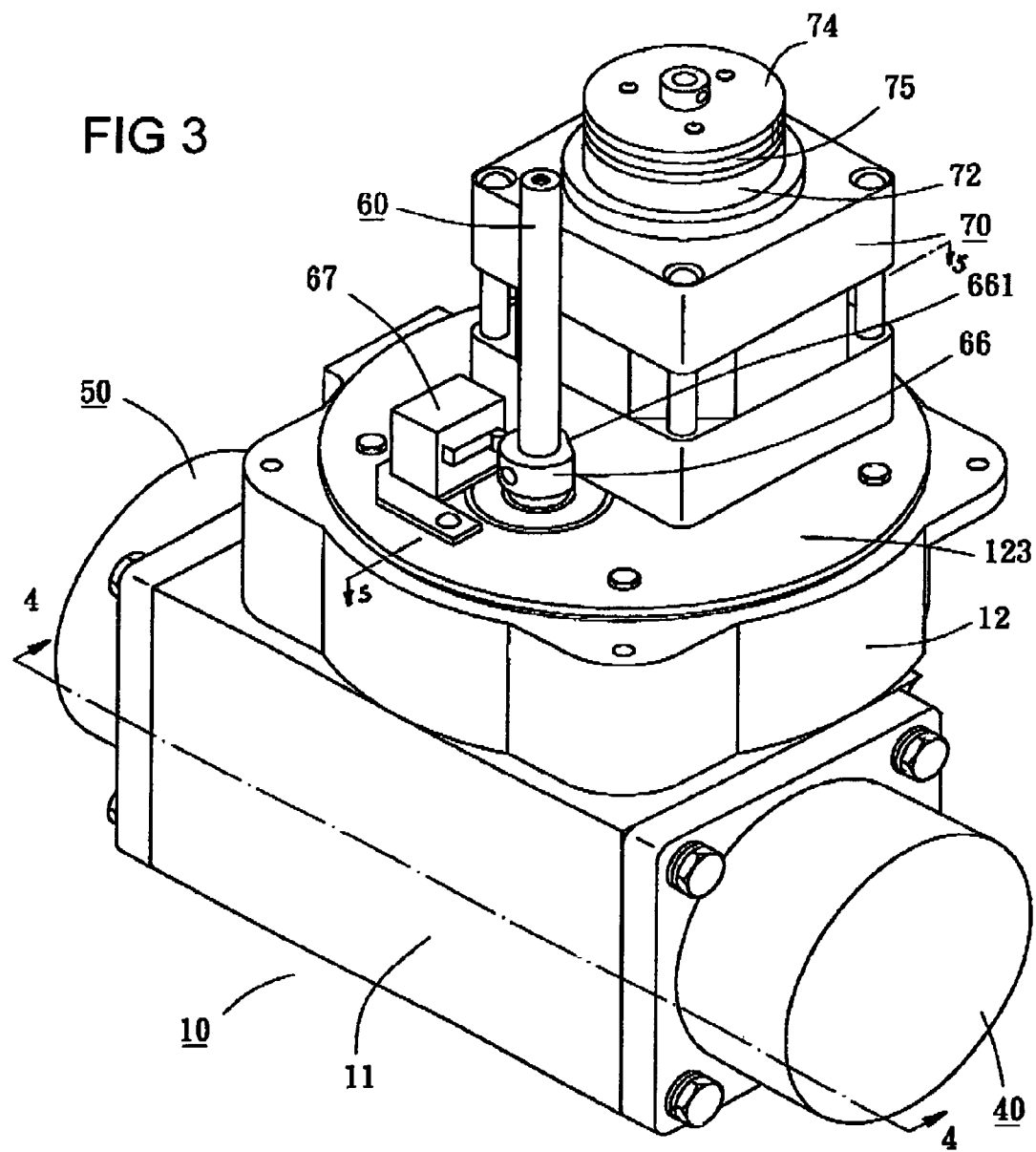
FIG. 3 is an assembled perspective view of FIG. 1.

Referring to FIG. 2 in company with FIGS. 1 and 4, similarly, a second actuating member 30 has a second disk part 31 with a plurality of second blind holes 32 being provided at the left side thereof and a second block member 33 extending rightward from the right side thereof. The second block member 33 has a second rack 331 at the front side thereof. The second disk part 31 has a second annular recess 311 at the circumferential side thereof with a second O-ring 312 being received in the second annular recess 311. The second actuating member 30 is inserted into and fits with the right end section of the second baring 116 to be opposite to the first actuating member 20.

Further, it can be seen in FIGS. 1 and 4, a first end cover 40 is fixedly attached to the right side of the main member 11 to block the right end of the axial through hole of the main member 11 and a plurality of third blind holes 41 as shown in FIG. 4 are provided at a side of the first end cover 40 to correspond to the first blind holes 22 of the first actuating member 20. A plurality of first elastic members 42 are disposed between the third blind holes 41 and the first blind holes 22 in a way of two ends of the respective first elastic member 42 being received in the respective first blind hole 22 and the respective third blind hole 42, which correspond to each other, such that the first actuating member 20 is pressingly held at a preset position due to elastic force of the first elastic member 42 respectively. The first elastic members 42 are spring shown in the figures. The first cover 40 has a third annular recess 43 at the side having the third blind hole 42 and the third annular recess 43 receives a third O-ring 44.

Similarly, a second end cover 50 is fixedly attached to the left side of the main member 11 to block the left end of the axial through hole of the main member 11 and a plurality of fourth blind holes 51 are provided at a side of the second end cover 50 to face and correspond to the second blind holes 32 of the second actuating member 30. A plurality of second elastic members 52 are disposed between the fourth blind holes 41 and the second blind holes 32 in a way of two ends of the respective second elastic members 52 being received in the respective second blind hole 32 and the respective fourth blind hole 51, which correspond to each other such that the second actuating member 30 is pressingly held at a preset position due to elastic force of the second elastic members 52. The second end cover 50 has a fourth annular recess 53 at the side having the fourth blind holes 51 and the fourth annular recess 53 receives a fourth O-ring 54.

Referring to FIGS. 5 and 7 in company with FIG. 1, an output shaft 60 has a joining part 61 at the lower end thereof to movably connect with the fitting hole 118 of the main member 11 for being attached to a valve or any other open and close device. A pinion 62 is attached to the output shaft 60 next to the joining part 61 to mesh with the first rack 231 and the second rack 331 respectively disposed at the first block member 23 of the first actuating member 20 and at the second black member 33 of the second actuating member 30 and a first cam 63 is attached to the output shaft 60 next to the pinion 62. The first cam 63 has a long axis, a short axis and an arc surface part 631. A screw member 64 passes through the threaded hole 117 and presses against an end of the arc surface part 631 as shown in FIG. 7. The output shaft 60 has a gear 65 at the middle section thereof being received in the hollow seat 12 to mesh with the speed reduction gear set 124. The output shaft 60 further has a second cam 66 at the upper section thereof and the second cam 66 has a flat surface part 661. A micro switch 67 is disposed next to the second cam 66.

Referring to FIG. 6 in company with FIGS. 1 and 5 again, a motor 70 is fixedly mounted to the second plate member 123 with the lower end of the motor shaft thereof attached with the driving gear of the speed reduction gear set 124 and the upper end of the motor shaft extending upward a rod part 71. The rod part 71 is fixedly attached with an electric magnet 72 and surrounded with a spring 73. The rod part 71 is secured with a stationary disk 74 at the upper end thereof and the stationary disk 74 has three holes 741 equidistantly spacing apart from each other. A movable disk 75 is disposed under the stationary disk 74 to be biased against the spring 73 and provides three sticks 751 corresponding to the holes 741 such that the sticks 751 are capable of passing through the holes 741.

Referring to FIGS. 8 to 11 in company with FIG. 5, in case of the position return device for an open and close apparatus according to the present invention is in operation, the speed reduction gear set 124 is driven to rotate the output shaft 60 counterclockwise once the motor 70 is powered on. Thus, the pinion 62 rotates counterclockwise with the output shaft 60 to urge the second actuating member 30 to move leftward to allow the second elastic members 52 being deformed and compressed as shown in FIG. 8. Meanwhile, the first actuating member 20 moves rightward synchronously to allow the first elastic members 42 being deformed and compressed at the same time. Hence, the inner end of the screw member 64 is incapable of pressing the arc surface part 631 of the first cam 63 as shown in FIG. 9. Further, when the output shaft 60 turns 90° to operate the valve or any other open and close device underneath, the second cam 66 turns 90° and the flat surface part 661 of the second cam 66 contacts the micro switch 67 to stop the motor 70 running and allow the electric magnet 72 being magnetized so as to attract the movable disk 75 downward against the biasing force of the spring 73 as shown in FIG. 11. In this way, the motor 70 keeps in a state of being unmoved with the output shaft 60 and the first elastic members 42 and the second elastic members 52 in a state of being deformed and compressed.

Under a condition of emergency such as power failure or power off accidentally, the force of the electric magnet 72 attracting the movable disk 75 is disappeared and the spring 73 pushes the movable disk 75 back to the original position such that the motor 70 and the output shaft 60 are free from being restricted and the first elastic members 42 and the second elastic members 52 push the first actuating member 20 and the second actuating member 30 back to the original positions thereof. Further, the inner end of the screw member 64 presses the arc surface 631 of the first cam 63 again as shown in FIG. 7 and the output shaft 60 only can rotate 90° so that the valve or any other open and close device connecting with the lower end of the output shaft 60 is capable of returning to the original open state or closed state conveniently.

While the invention has been described with referencing to a preferred embodiment thereof, it is to be understood that modifications or variations may be easily made without departing from the spirit of this invention, which is defined by the appended claims.

What is claimed is:

1. A position return device for an open and close apparatus, comprising:

a casing base, providing a rectangular main member with a hollow seat member on top of the rectangular main member, the main member having a first through hole, which is divided into a right hole section, a middle hole section and a left hole section along an axial direction of the first through hole with a support plate being disposed in the axial through hole at the lower wall surface of the middle hole section and a bearing fitting with the right hole section and the left hole section respectively, a through threaded hole being disposed at a rear side of the main member to communicate with the middle hole section, a second through hole being disposed at a bottom wall of the hollow seat member to communicate with the middle hole section, a fitting hole being disposed at the support plate to pierce a bottom side of the main member to correspond to the second through hole, a first circular plate member being fixedly attached to the bottom wall of the hollow seat member, a second circular plate member being fixedly attached to an open upper side of the hollow seat, and a speed reduction gear set, which provides being disposed in side the hollow seat;

a first actuating member, having a first disk part and a first block member extending from a side of the disk part with a first rack provided at the first block member, and being inserted into the first through hole from a right side of the main member to allow the first disk part fitting with the first bearing;

a second actuating member, having a second disk part and a second block member extending from a side of the second block member with a second rack provided at the second block member, and being inserted into the first through hole from a left side of the main member to allow the second disk part fitting with the second bearing;

a first end cover, being fixedly attached to the right side of the main member to block an end of the first through hole and providing a plurality of first elastic members extending to the first actuating member to press and hold the first actuating at a first preset position;

a second end cover, being fixedly attached to the left side of the main member to block an end of the second hole and providing a plurality of second elastic members extending to the second actuating member to press and hold the second actuating at a second preset position;
an output shaft, having a joining part at an end thereof to movably connect with the fitting hole of the main member for being attached to a valve or any other close device, providing a pinion next to the joining part to mesh with the first rack and the second rack respectively, having a first cam with an arc surface being disposed next to the pinion, having a gear at the middle section thereof to be disposed in the hollow seat and to mesh with the speed reduction gear set, having a second cam with a flat surface being disposed above the second circular plate;
a micro switch, being disposed on the second circular plate next to the second cam; and
a motor with a motor shaft, being fixedly mounted to the second circular plate upper plate member with an end of the motor shaft being attached with a driving gear of the speed reduction gear set and another end of the motor shaft extending upward a rod part, which is fixedly attached with an electric magnet, surrounded with a spring secured with a stationary disk at an end thereof, the stationary disk having three locating holes equidistantly spacing apart from each other, a movable disk being disposed under the stationary disk and biased against the spring and providing three equidistant sticks corresponding to and inserting into the locating holes.

2. The position return device for an open and close apparatus as defined in claim 1, wherein the first actuating member provides a plurality of first blind holes and the first end cover provides a plurality of third blind holes corresponding to the first blind holes and the elastic members are disposed between the first end cover and the first disk part in a way of both ends of the first elastic members being inserted into the third blind holes the first blind holes respectively; and the second actuating member provides a plurality of second blind holes and the second end cover provides a plurality of fourth blind holes corresponding to the second blind holes and the second elastic members are disposed between the second end cover and the second actuating member in a way of both ends of the second elastic members being inserted into the fourth blind holes and the second blind holes respectively.

3. The position return device for an open and close apparatus as defined in claim 1, wherein the first and the second elastic members are springs.

4. The position return device for an open and close apparatus as defined in claim 1, wherein the first disk part has a first annular recess at the circumferential side thereof to receive a first O-ring and the second disk part has a second annular recess at the circumferential side thereof to receive a second O-ring.

5. The position return device for an open and close apparatus as defined in claim 1, wherein the first end cover has a third annular recess at the side having the third blind holes to receive a third O-ring and the second end cover has a fourth annular recess at the side having the fourth blind holes a fourth O-ring.

* * * * *